UNITED STATES PATENT OFFICE.

WILLIAM P. KAUFMANN, OF TORONTO, ONTARIO, CANADA.

MANUFACTURE OF MALT SYRUPS AND MALTOSE.

1,181,460. Specification of Letters Patent. Patented May 2, 1916.

No Drawing. Application filed September 25, 1913. Serial No. 791,828.

*To all whom it may concern:*

Be it known that I, WILLIAM PEROT KAUFMANN, M. D. C. M., of the city of Toronto, in the Province of Ontario, Canada, have invented certain new and useful Improvements in the Manufacture of Malt Syrups and Maltose, of which the following is a specification.

Maltose syrup and maltose have so far been commercially prepared by the action of an amyloclastic diastase on starchy materials usually derived from some of the more common grains or cereals such as maize, wheat, rice, etc.

The older processes using malt diastase and graminaceous starch conducted the reaction at atmospheric pressure and at a temperature of not exceeding 65°–75° C. and light liquors of a specific gravity of only 3°–5° B. were obtained. The products were of good quality but the expense of concentrating the light liquors is too great.

The processes cannot be conducted at a greater concentration as the starch gelatinizes and swells (even in the presence of diastase) and will not respond properly to the hydrolytic influence of the diastase. Pressure cooking was then resorted to, the starch being treated at a steam pressure of about three atmospheres above the normal atmospheric pressure and at corresponding temperatures before or after treatment for liquefaction with the diastase. Starch so treated is more readily hydrolyzed than starch cooked in open vessels and light liquors of from 5°–16° B. can be obtained, but the product is not as good in quality inasmuch as the drastic pressure cooking, especially when it takes place in the presence of free acid, or after a preliminary treatment with malt, tends to decompose the fats, proteids and cellular matter present and to caramelize the sugar which is formed thus imparting an undesirable flavor and dark appearance to the product.

Many attempts have been made to combine the good points of both the open and closed converter processes particularly by highly purifying the starch before treatment, but such processes have not been commercially successful being either too expensive, too complicated or else resulting in unsatisfactory products.

After a long series of experiments I have come to the conclusion that drastic preliminary pressure cookings are absolutely necessary in the manipulation of cereal starches, and all those which contain a large proportion of the higher polymerized or condensed starch carbohydrates, potato starch also being included. As such pressure cooking is unsatisfactory, the improvement of the older open converter processes seemed the natural line of research.

The great problem to be solved in the use of open converter processes is to devise means of working at higher concentrations without causing the gelatinization and consequent "freezing" of the starch during the liquefaction treatment.

I have found that all starches commonly employed pass into the gelatinous form at temperatures and concentrations which are commercially practical in open converter processes and I have therefore mainly directed my experiments to attempting the discovery of a starch, sufficiently cheap, which would possess the property of remaining limpid when heated with malt diastase at temperatures of 60° to 70° C. and in solutions of 16°–20° B. or higher. Cassava starch under such conditions remains perfectly limpid and easily stirrable by virtue of the fact that the starch granules break up or fragment, and without material swelling, pass almost instantly into water soluble products of low viscosity without assuming the intermediate gelatinized and pasty condition characteristic of other starches. The result was altogether unexpected and could not be foreshadowed, as other root starches, including the potato yam and sweet potato act in much the same way as cereal starches.

In the treatment of the cassava starch I use an amyloclastic diastase preferably of graminaceous origin and in the form of green or kiln dried barley malt.

While good results may be obtained by the use of any amyloclastic diastase I find that in the treatment of a root starch that the best results are obtained by using a graminaceous diastase, and this is one reason why I prefer to use the barley malt.

Malt of suitable quality, preferably green, is finely ground or crushed and is extracted with a suitable quantity of water at any convenient temperature which will not impair the activities of the diastase, or cause the mass to ferment or become sour. The watery extract is separated from the branny and starchy residues by means of a filter press or other convenient means, and the extract, if necessary, is suitably treated to render it clear and free from starch granules. These processes are well known in the art and need not be more particularly described.

The starch when separated from the watery extract is mixed with the malt residues.

The process may be graphically presented as per the following diagram,—

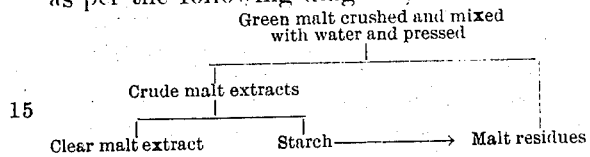

The cassava starch may be used in the purified form if necessary, that is, in the form known commercially as tapioca starch or tapioca flour.

In general practice I prefer to employ the cassava root which may be used in the fresh state as dug from the fields and suitably cleaned. The roots are then preferably peeled, crushed and finely ground and finally subjected to squeezing in a suitable press to remove the watery liquor therefrom. The liquor thus obtained contains starch in suspension in small quantities, and also sugars and extractive matters, etc., soluble in the watery medium. The starch is separated from the liquor by any convenient means known to the art and mixed with the press cakes while the liquor is concentrated and made into the product known as cassareep which is used in the preparation of sauces and condiments.

The press residues may be used at once for the preparation of maltose syrups, or, preferably, are first washed with water containing hypochlorites, sulfites, hydrochloric acid or caustic soda in solution, so as to further purify the residues by washing out the materials, other than starch, which are soluble in aqueous solutions of the above reagents. These washings are then neutralized by appropriate means and may be mixed, if desired, with the crude press liquor for the manufacture of cassareep.

The processes just described are graphically set out in the following diagram:—

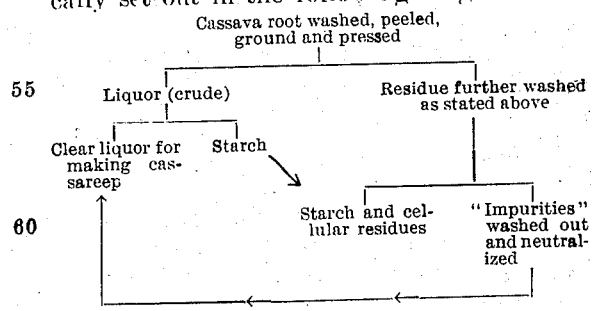

If desired, the crushed and pressed roots may, either before or after being washed, be dried and this dried material subsequently used for making maltose syrup with or without further washing. So also the roots, after being cleaned and peeled, may be sliced into suitably sized pieces and dried, and this material when ground and with or without further washing, may form the basis of manufacture for maltose syrups. For purposes of shipment from the place of production this drying of the material is of great importance.

Having obtained the malt extract, the malt residues and the cassava starch as hereinbefore described, I proceed as follows: Water of a suitable type, that is, water which is neither alkaline, saline or sulfurous, is run into a vat fitted with heating coils and with a stirrer. These coils provide means for heating the contents of the vat with steam or hot water, or for cooling the contents by circulating cold water through them. A sufficient quantity of water is heated to 60° C. and the stirrer set in motion. Malt residues derived from a quantity of malt (green malt contains 40% water) calculated to the dry basis as equivalent to substantially 11% of the weight of cassava starch to be used, is thoroughly stirred in. The cassava starch or meal in the dry state, or creamed up with water is then fed into the malt water at such a rate that it becomes almost instantly incorporated with the water. The gravity of the mash should not be less than 20° B. at 65° C. During the addition of the cassava starch or meal the temperature of the mash is caused to rise gradually so that it will be at or about 65° C. when all the starch is added. The mash is maintained at this temperature for about ten minutes, it is then raised to 68° to 70° C. and maintained thereat for about thirty minutes. After this it is heated rapidly to its boiling point and kept boiling for fifteen to twenty minutes or longer, constant and energetic agitation being maintained all the time if necessary.

While boiling at atmospheric pressure is sufficient for my purposes, yet I may adopt pressure cooking at this stage using a steam pressure of preferably about one and not more than three atmospheres, the temperature corresponding to these pressures. I may also employ mashing under pressure without raising the temperature above the death point of the diastase as produced by the introduction of a gas under pressure into a closed converter containing the mash, and proceeding after the action of the diastase has been completed in either of the ways specified above, that is by ordinary boiling or pressure cooking.

With a little experience it is easy to do the entire heating by means of steam instead of hot water and to avoid "pasting" on the coils or gelatinization or "freezing" of the mash as a whole, and without destruction of the diastase. Under similar conditions it is impossible to treat suspensions of other starches in the same manner without gelatinization and consequent freezing taking place. This first operation is known as the liquefaction stage, although some saccharification ensues, and liquefaction having been accomplished the mash is cooled down to about 60° C. The clear malt extract is now added to saccharify the mass, agitation being maintained and the whole mash held at a temperature of 60° C. or raised to a temperature of not over 65° C. The addition of the malt extract should not reduce the specific gravity of the mash below 16° B. at 65° C. Under these conditions of temperature and concentration the saccharification of the mash will be complete in about two or three hours when it will be ready for filtration. This saccharification mashing may also, if preferred, be conducted in a closed converter under gas pressure at a temperature approximating 65° C. substantially in the same manner as the liquefaction mashing hereinbefore mentioned.

If a diastatic extract for bakers' or pharmaceutical purposes is desired the mash is not heated above 65° C. and is then filtered and concentrated to the desired consistency in vacuo without further treatment.

If an extract for confectioners' use is required, the mash, after saccharification, is boiled for ten minutes, filter pressed and concentrated as usual without further refining. The product may of course, if desired, be refined in any of the well known ways commonly employed.

While, as stated, a more or less refined cassava starch may be employed, in practice I prefer to use the crushed and ground root of the cassava, preferably washed, but containing almost all of its cellulosic constituents; as the presence of these constituents facilitates filtration by forming a more or less bulky filter mass. If the refined starch is employed it may be necessary to add to the mash a suitable quantity of cassava meal, or instead to incorporate in the mash a sufficiency of well washed and finely prepared paper pulp, or both of these adjuncts to give the desired bulk of filter mass.

By leaving all the cellular constituents in the cassava meal, or by adding appreciable quantities of wood pulp, or its equivalents to the mash made with more or less refined starch, a bulky press cake is obtained which greatly facilitates filtration.

The press cake residues may be washed in situ or may be pressed resulting in the first place, in the production of sweet waters useful for washing presses or making up succeeding mashes, and in the second place in light liquors which may be incorporated with the first light liquors filtered out, for concentration as hereinbefore described. The residues from the presses are available for cattle feed.

It will be found that by treating cassava starch with an amyloclastic diastase preferably barely malt substantially in the manner hereinbefore set forth that an excellent quality of maltose syrups may be produced at a concentration which makes the process commercially practicable.

The later steps of the process are graphically illustrated in the following diagram:

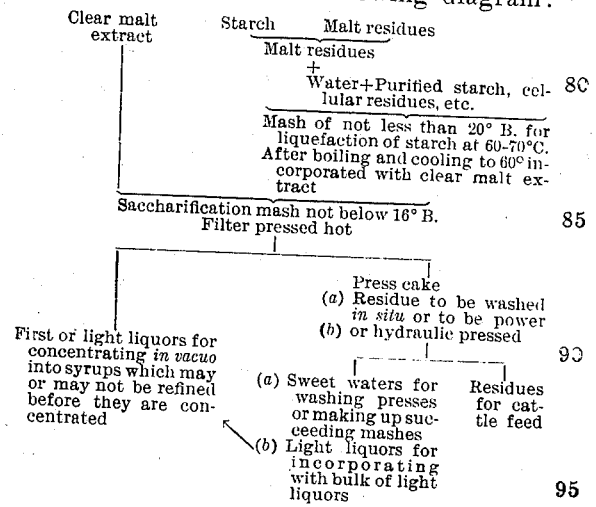

What I claim as my invention is:

1. A process of producing sugary products from starch which consists in extracting malt with a suitable amount of water, separating the extract from the residues, forming a hot mash of the malt residues with water and cassava starch of a gravity of substantially 20° B. maintaining said mash at a suitable temperature till liquefaction has taken place, adding the malt extract at a suitable temperature to the mash to reduce the gravity to not less than 16° B. and maintaining the mash at a suitable temperature till saccharification has taken place.

2. A process of producing sugary products from starch which consists in extracting malt with a suitable amount of water, separating the extract from the residues, forming a hot mash of the malt residues with water and cassava starch of a gravity of not less than 20° B. maintaining said mash at a temperature of 60°–70° C. for about thirty minutes, then raising the temperature to boiling point till liquefaction has taken place, cooling the mash to about 60° C. adding the malt extract at a suitable temperature to the mash to reduce the gravity to not less than 16° B. and maintaining the mash at a temperature of 60°–65° C. till saccharification has taken place.

3. A process of producing sugary products from starch which consists in extracting malt with a suitable amount of water, separating the extract from the residues, forming a hot mash of the malt residues with water and ground cassava root of a gravity of substantially 20° B. maintaining said mash at a suitable temperature till liquefaction has taken place, cooling the mash to 60° C. adding the malt extract, at a suitable temperature, to the mash to reduce the gravity to not less than 16° B. and maintaining the mash at a suitable temperature till saccharification has taken place and finally filter pressing the mash.

4. A process of producing sugary products from starch which consists in extracting malt with a suitable amount of water; separating the extract from the residues; mixing the malt residues with hot water at a suitable temperature and subsequently stirring in starch, and maintaining the mash at a suitable temperature till liquefaction has taken place.

Toronto, this 17th day of Sept., A. D. 1913.

WILLIAM P. KAUFMANN, M.D.C.M.

Signed in the presence of—
J. EDW. MAYBEE,
D. S. TOVELL.